Aug. 7, 1928.

A. H. KENNEDY

SANITARY WATER CLOSET

Filed Jan. 4, 1926

Inventor

Albert H. Kennedy.

By Emery, Booth, Janney & Varney his Attorneys

Patented Aug. 7, 1928.

1,679,669

UNITED STATES PATENT OFFICE.

ALBERT H. KENNEDY, OF ROCKPORT, INDIANA.

SANITARY WATER-CLOSET.

Application filed January 4, 1926. Serial No. 79,213.

My invention relates more especially to water-closet bowls and aims to improve the operation thereof by increasing the effectiveness of the flushing water.

Referring to the accompanying drawing, wherein I have shown one embodiment of my invention:

Figure 1:
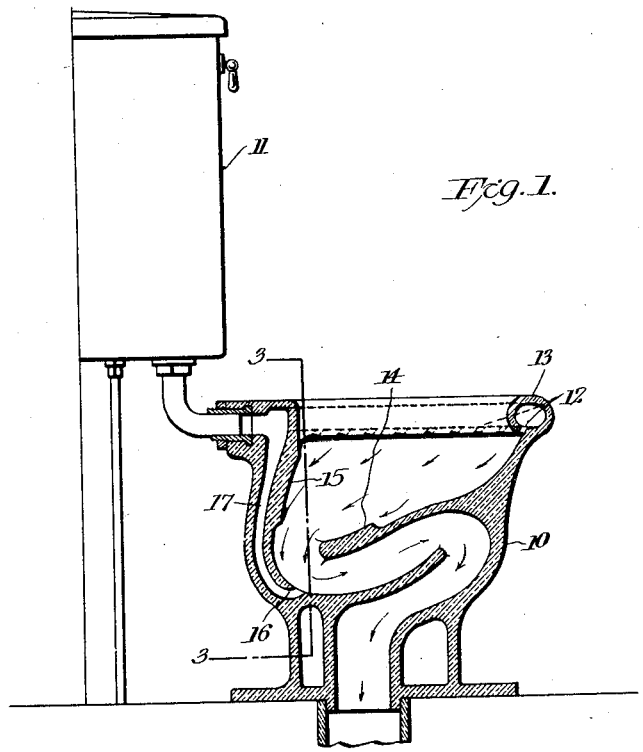
Fig. 1 is a view partly in side elevation and partly in section showing a water-closet bowl embodying my invention.

In the illustrative example of my invention shown in the drawings, I have applied my improvements to a bowl 10 of the syphon trap type of conventional shape. It is shown as being connected to an ordinary flush tank 11 in the usual manner.

My improvement contemplates the provision of jet openings 12 at suitable intervals around the rim conduit 13 so arranged to direct streams or jets of water upon its interior surface in directions which converge toward the throat of the bowl to produce a maximum flushing or scavenging effect for a given quantity of water and to reduce the noise which usually results upon flushing bowls of this type.

Figure 2:
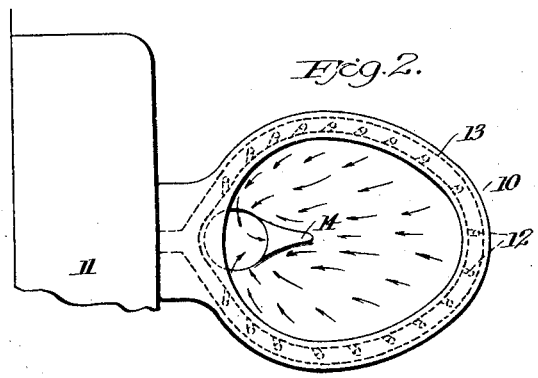
Fig. 2 is a top plan view of the water-closet bowl shown in Fig. 1.

Referring to Fig. 2, I have there shown one effective arrangement of jet openings wherein they are all directed rearwardly of the bowl and obliquely to its inner surface, some of them, preferably at the sides, discharging against the rear curved wall of the bowl, which causes the streams to sweep around this wall without encountering any sharp turns or changes in course which usually entail a loss in velocity.

To augment the scavenging effect in the throat, the jets issuing from the rim at the front of the bowl are directed against the rear curved wall by suitable means. For example, I have shown a raised portion or boss 14 conveniently pointed at its forward edge and having inclined side edges acting as baffles or guides to prevent the streams from flowing or tending to flow directly across the throat squarely against the rear wall. Thus, the streams from the front and sides of the rim are caused to cooperate to produce a maximum scavenging action.

Figure 3:
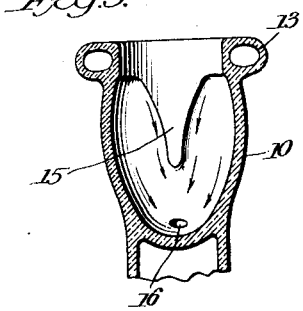
Fig. 3 is a fragmentary sectional view taken on the line 3—3 of Fig. 1.

At the rear of the bowl (see Fig. 3) I provide another baffle to prevent the jets on the sides of the rim from clashing or conflicting with each other and to direct them downwardly along the back wall of the throat portion directly into the trap. Herein I have shown a boss 15 which may be and preferably is substantially triangular with its apex slightly above the throat to produce the desired effect. This boss is quite similar to that shown in the bottom of the bowl, its edges forming guides or baffles for the streams which strike them and directing into the throat in the direction of discharge. Thus, the full force of the jets is utilized and the objectionable noise incident to conflicting streams at the throat is eliminated.

Further to accentuate the flushing or scavenging action of the rim jets 12, I have shown a jet opening 16 (Fig. 1), conveniently arranged to discharge forwardly into the trap near the bottom and this jet is supplied from the inlet to the rim conduit through a duct 17 preferably provided in the rear wall of the bowl. This jet serves to initiate and accelerate the discharge of water from the trap and prevent it from backing up into the bowl because it discharges directly into the trap with a very considerable velocity in the direction of the discharge.

My improved arrangement insures the complete scavenging of the bowl with less water than is usually required for this purpose. It utilizes the full force of the jets instead of depending upon the water backing up or accumulating in the bowl to flush it. Moreover, it eliminates to a great extent the noise usually resulting from streams pouring into trapped water.

Obviously my invention is capable of various changes.

What I claim and desire to secure by Letters Patent is:

1. A water-closet bowl of the syphon trap type comprising a rim conduit having a plurality of downwardly and rearwardly directed jet openings all arranged to discharge with substantially full force along the rear wall of the bowl at the throat and baffle means on the bottom of the bowl to prevent the streams discharged from the front of the rim from flowing across the throat, said baffle means being arranged to deflect the jets to the sides of the throat and against the rear wall thereof.

2. In a water-closet bowl of the syphon trap type and having a rearwardly inclined bottom wall, a rim having a plurality of jet openings therein and a baffle adjacent to the throat portion constructed and arranged to divert some of the jet streams rearwardly around the throat whereby to cause them to sweep along the rear wall of the bowl.

3. In a water-closet bowl of the syphon trap type having a rearwardly inclined bottom wall, a rim conduit presenting a plurality of rearwardly directed jet openings converging toward the rear wall of the bowl near the throat, a boss adjacent to the throat having side edges converging to a point toward the front of the bowl and providing baffles to direct streams toward the rear wall of the bowl around the throat and a jet opening arranged to discharge directly into the trap to accelerate the flushing action.

4. In a water-closet bowl of the syphon trap type having a rearwardly inclined bottom wall with the throat at the rear, a rim conduit having a plurality of rearwardly directed jet openings arranged to discharge streams converging toward the rear wall of the bowl and a baffle arranged to prevent streams coming from opposite sides from conflicting with each other and to guide them downwardly into the throat and trap along the rear wall.

5. In a water-closet bowl of the syphon trap type having a rearwardly inclined bottom wall with the throat at the rear, a rim conduit having a plurality of jet openings arranged to discharge streams converging toward the rear wall of the bowl, a substantially triangular boss in the bowl adjacent to the throat having edges arranged to guide streams around the opposite side of the throat and baffle means on the rear wall of the bowl arranged to prevent some of the streams issuing from the jet openings from conflicting with and counteracting each other at the rear of the throat and to guide them directly downwardly into the trap.

In testimony whereof, I have signed my name to this specification.

ALBERT H. KENNEDY